Figure 2:
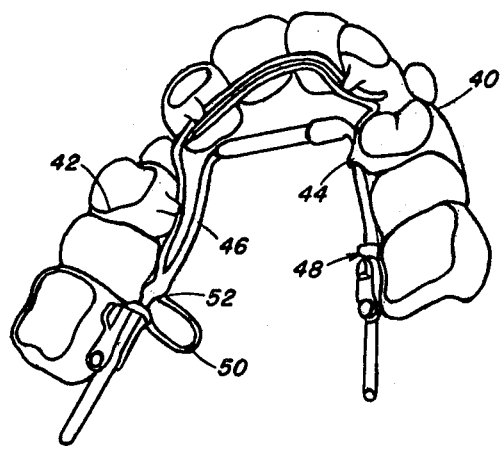
Figure 1:
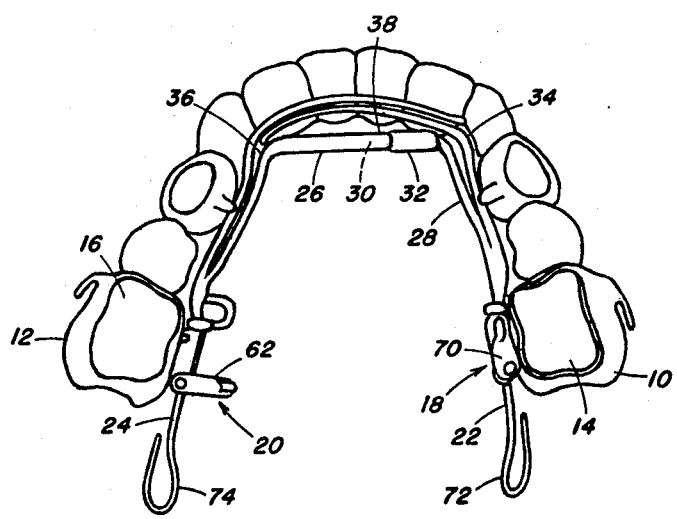
Figure 4:
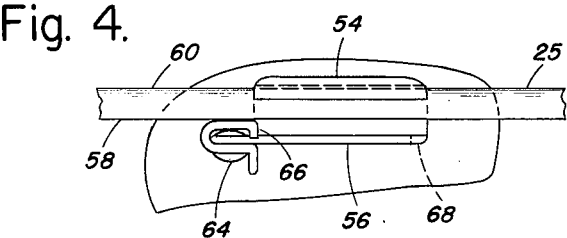
Figure 3:
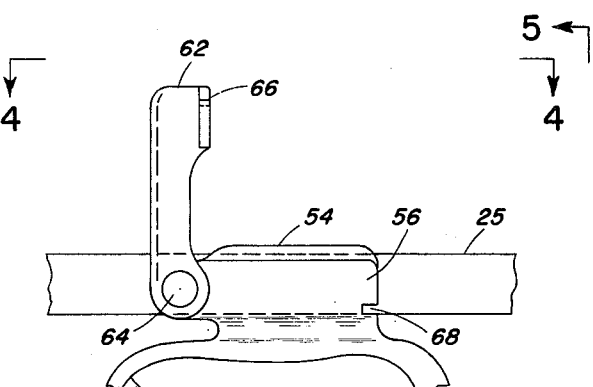
Figure 5:
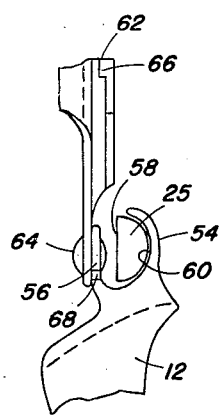
Figure 7:
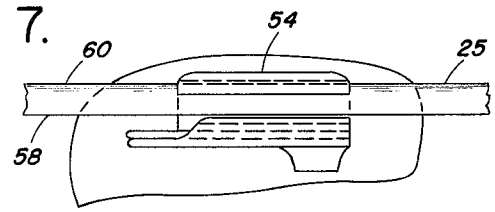
Figure 6:
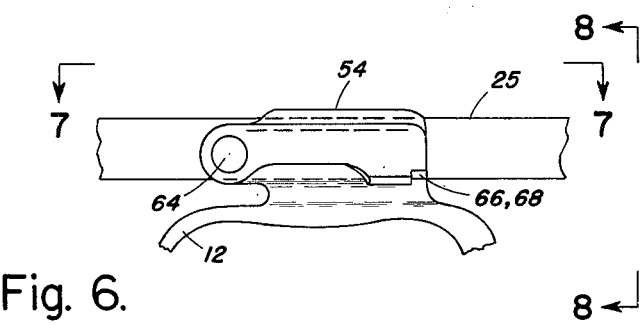

Sept. 14, 1965    J. A. LINDE    3,205,577

INTRA-ORAL APPLIANCE FOR STRAIGHTENING TEETH

Filed April 15, 1963    2 Sheets-Sheet 1

INVENTOR
John A. Linde
BY
Tenner & Erstad
ATTORNEY

Sept. 14, 1965   J. A. LINDE   3,205,577
INTRA-ORAL APPLIANCE FOR STRAIGHTENING TEETH
Filed April 15, 1963   2 Sheets-Sheet 2

INVENTOR
John A. Linde
BY
*Tennes ?Eastad*
ATTORNEY

United States Patent Office 3,205,577
Patented Sept. 14, 1965

3,205,577
INTRA-ORAL APPLIANCE FOR STRAIGHTENING TEETH
John A. Linde, 31–33 Sands St., Bronx, N.Y.
Filed Apr. 15, 1963, Ser. No. 272,919
4 Claims. (Cl. 32—14)

This invention relates to orthodontic appliances for straightening teeth and also to a method for straightening teeth.

In straightening teeth it is the practice to employ appliances which will apply the correct amount of pressure in the correct direction to the teeth which have to be moved. In order to move such teeth, it is often necessary to expand or contract the entire arch. In addition, it is often also necessary to change the distal distance between the molar teeth and the anterior teeth in order to provide room for the teeth being moved, and also to provide the correct occlusion between the teeth in the upper and lower jaws.

It is an object of the present invention to provide an improved method and device for applying spring tension between the molar and anterior teeth to change the distal distance therebetween.

A further object of this invention is to provide a slide lock attachment for an orthodontic appliance to facilitate effecting a distal movement between the anterior teeth and the molar teeth.

Another object of this invention is to provide a slide lock for an orthodontic appliance which will permit the orthodontic appliance to be easily detached from the teeth so as to permit an adjustment to be made in the spring tension being exerted by the appliance on the teeth.

A further object of this invention is to provide a lock for an orthodontic appliance which may be quickly snapped into place and which will lock the rear support of the appliance against lateral movement while permitting the appliance to have free longitudinal movement through the slide lock.

Another object of this invention is to provide an improved orthodontic appliance which will exert distal pressure on teeth and wherein the appliance may be readily removed and adjusted to change the pressure being exerted.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

FIG. I is a perspective view of an orthodontic appliance employing my improved lock wherein the lock mechanism has been opened.

FIG. II shows a perspective view of an orthodontic appliance employing my improved lock which is in closed position.

FIG. III is a cross-sectional plan view of my improved locking device in open position.

FIG. IV is a side elevation of my improved lock taken on line 4—4 of FIGURE III.

FIG. V is an end elevation taken on line 5—5 of FIGURE III.

FIG. VI is a top plan view showing my improved lock mechanism in closed position.

FIG. VII is a side view taken on line 7—7 of FIGURE VI showing my improved lock in closed position.

FIG. VIII is an end view taken on line 8—8 of FIGURE VI.

The orthodontic appliance I have used to illustrate my invention and shown in FIGURE I is secured to the teeth of the jaw by means of bands 10 and 12. These bands are secured around the molar teeth 14 and 16 by a suitable temporary dental cement. The appliance shown in FIG. I is applied to the teeth in a lower jaw while the appliance shown in FIGURE II is applied to the teeth in an upper jaw.

My improved lock device, designated generally by the reference characters 18 and 20, is fixed to the inside of the bands 10 and 12. This lock is secured in this manner at the time the appliance is made by suitable means such as silver solder. The bands 10 and 12, the locks 18 and 20 and the appliance structure may be made of any suitable material such as stainless steel, silver, gold or other metal or alloys. I have preferred to use stainless steel because of its ruggedness and durability. The orthodontic appliance is detachably secured to the locks 18 and 20. The appliance consists of a wire frame structure, 22 and 24, which is of a generally U-shaped configuration. One side of the loop of the U-frame has a hollow tube extension 26. The other side, 28, of the U-shaped frame has a threaded end, 30, which slidably and telescopically extends inside the tube portion 26. A nut, 32, is threaded on the threaded rod, 30, at the time the U-shaped frame structure is assembled.

Also fixedly attached at one end to the main wire frame members 22 and 24 is a pair of spring arms 34 and 36 which may be so bent by the orthodontist using the appliance so that it applies pressure in the area desired.

By turning the nut 32, so as to unscrew it from the rod 30, it will cause the forward end 38 of the nut 32 to push against the abutting end of the sleeve 26. This causes the threaded rod 30 to be withdrawn from the sleeve 26 to the extent that the nut 32 is rotated. It will be evident that when the loop of the brace is expanded in this manner it will cause outward lateral pressure to be brought to bear against all teeth with which the spring members 34 and 36 engage. Any ancillary springs attached to the frame members would also apply pressure to their respective teeth in like manner.

In order to hold the forward end of the brace, 22 and 24, downwardly in correct operating relationship with respect to the teeth, a pair of suitable holding bands such as shown in FIGURE II are employed. These bands were omitted in FIGURE I to better illustrate the operating arrangement of the orthodontic appliance. Bands, similar to bands 42 and 44 in FIGURE II, are cemented fast to two of the forward teeth and have hooks 44 and 46 respectively under which the springs 34 and 36 are snapped.

While the jaw is being expanded laterally in this manner, it is sometimes also desirable to increase the distance between the forward teeth and the rear molars. Heretofore it has been necessary to rely either on the forward springs for this purpose or to do this in a separate expansion operation or by a very complex appliance which was more difficult to adjust.

My improved lock enables this distal extension to be simultaneously accomplished together with the lateral expansion of the teeth. This is advantageous not only in saving time but also in effecting an adjustment of the teeth which is more natural and coordinated into an integrated operation. This distal pressure is effected by means of springs 48 and 50, one of which is very clearly shown in FIGURE II. One end of each of springs 48 and 50 is fixedly secured to the frame members, 22 and 24, respectively.

The springs 48 and 50 are arranged in the form of a loop so that the free ends of each spring apply a spring tension pressure against the end of the slide lock fasteners 18 and 20. Since the wire frame members 22 and 24 are slidably secured to the locks 18 and 20, this permits the frame members 22 and 24 to be pushed forward by the free end of springs 48 and 50 pushing against the lock fasteners 18 and 20, which are fixedly secured to the molar teeth 14 and 16. This effects a distal movement of the teeth in the direction desired.

In FIGURES III to VIII I have shown in enlarged sectional views the lock mechanism for facilitating the adjustment mentioned above, the construction of which I will now describe. Referring to FIGURES III, IV and V, the lock mechanism 20 is secured to the band 12 and comprises an elongated member having a slot with a depression extending along the length of the elongated member, the slot being surrounded by two ears 54 and 56. It will be clear from the cross-sectional end view in FIGURE V that the wire frame member 25 has one side 58 which is somewhat flattened while the other side 60 has a rounded configuration. The thickness of the wire frame member 24 is such that it can be readily inserted through the slot of the U-shaped receiving ears 54 and 56, so as to permit the entire appliance, when the holding locks 18 and 20 are opened, to be quickly removed from the mouth of the patient so as to permit the various spring tension wires to be adjusted and bent so as to apply pressure in the direction desired.

Figure 8:
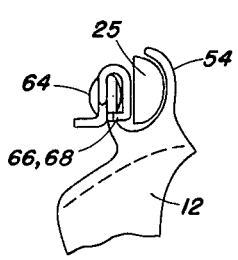

After the spring tension wires have been so adjusted, the appliance is then replaced in the mouth of the patient and the locks 18 and 20 are closed. This is effected by swinging the pivoted locking pawl 62 into closed position as shown in FIG. VI. The locking pawl 62 is pivotally secured to the ear 56 by means of a tiny pivot rivet 64. One end of the pawl 62 has a small hook 66 which snaps into a small hole 68 which is formed in the member 56. When the pawl 62 is swung into closed position in this manner as shown in FIGURE 8, it prevents the frame member 24 from moving laterally out of the mouth of the lock formed by the members 56 and 60. The complementary hook and hole 66 and 68 causes the pivot member 62 to be held in closed position. Instead of a hook and hole, a pair of corresponding protrusions and depressions could also be used for this purpose. While I have shown the frame member as being half round, other cross-sectional configurations could also be used.

It will be clear from the foregoing description that the frame members 22 and 24 can be moved axially relative to the locks 18 and 20, either by opening the pivot member 62 and 70, so as to permit their respective springs 48 and 50 to apply tension between the forward teeth and the rear molars by acting against their respective locks 18 and 20, or, if desired, sufficient clearance can be provided between the locking pawls and the opposite arms 54 of the locks 18 and 20 so as to allow for free axial movement of the frame members 22 and 24 when the front lock members 62 and 70 are in closed position, and thereby exert continuous distal pressure between the front teeth and the molar teeth.

It will thus be evident that my improved lock can be used with a frame member having continuous free sliding axial movement when the locking pivot members are in closed position or with frame members that are held locked against free axial movement by the pivot members when they are in closed position. In the latter case, the pivot members 62 and 70 may be quickly released to permit an axial movement of the frame members 22 and 24 to take place as soon as the locks 18 and 20 are opened. As soon as the pivot members are closed they re-lock the frame members 22 and 24. This arrangement may be preferred where continuous distal pressure is not desired or needed. In most cases, however, the free sliding arrangement is preferred where continuous pressure is exerted.

The rear extension of the frame members 22 and 24 may extend straight back as shown in FIGURE II or they may be provided at the end with a loop 72 and 74 respectively as shown in FIG. I. These loops or straight bars may be appropriately bent at the ends to apply lateral pressure in the desired area against the rear molars if this is desirable.

The bands 10 and 12 may also be provided with suitable wire extensions which can be used to either hold the teeth in proper alignment, or, if spring tensioned, will apply suitable force to the teeth they contact to move the same into alignment in the direction desired.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. An orthodontic appliance comprising a U-shaped main frame member adapted to fit inside a human jaw; molar teeth bands adapted to be secured to molar teeth, openable and closable retaining locks secured to said bands, channels receiving the ends of said frame member formed in said locks, said channels being of a cross section larger than the cross section of said frame member allowing free sliding movement of said frame member ends through said channels, spring means secured to said frame member and abutting said locks adjacent to said channels to apply axial spring tension to said frame member; means for holding said retaining locks in closed position to confine said frame member to axial movement through said channels, and spring means secured to said frame member to exert pressure on teeth to be straightened.

2. An orthodontic appliance comprising a U-shaped wire frame member adapted to be positioned adjacent the teeth of a human jaw, anchoring bands adapted to be secured to teeth, openable and closable locks attached to said bands and each having a channel passageway formed therein receiving the legs of said U-shaped wire frame member, said passageway having a cross-sectional area larger than the cross-sectional area of the legs extending through the channels allowing the legs to have free axial movement therethrough, said locks having means restricting said legs to axial movement in said channels, spring members formed on said legs and abutting said locks adjacent said channels to cause spring tension to be exerted on said legs, and teeth straightening members formed on said frame member to exert pressure on teeth to be straightened.

3. An orthodontic appliance comprising a relatively inflexible U-shaped wire, teeth gripping bands, openable and closable lock members secured to said bands and having channels receiving therein the legs of said U-shaped wire, and having means restricting said legs to axial movement in said channels, said channels being of a dimension allowing said legs to freely slide therethrough, spring members mounted on said wire and abutting said locks adjacent said channels to impart axial spring tension to said U-shaped wire, and means secured to said U-shaped wire to exert pressure on teeth to be straightened.

4. An orthodontic appliance comprising anchoring bands adapted to be secured to teeth, a U-shaped wire frame member, openable and closable retaining locks secured to said bands, channels formed in said locks and receiving the ends of said frame member, a spring member secured to said frame member and abutting each of said locks adjacent said channels to exert axial spring tension to said frame member, said channels being of size larger than said frame member thereby allowing the frame member to move axially therethrough, and means carried by said frame member to exert pressure on teeth to be moved.

References Cited by the Examiner

UNITED STATES PATENTS

| | | | |
|---|---|---|---|
| 274,367 | 3/83 | Patrick | 32—14 |
| 1,207,566 | 12/16 | Korbitz | 32—14 |
| 2,023,849 | 12/35 | McCoy | 32—14 |
| 2,318,001 | 5/43 | Linde | 32—14 |
| 3,036,380 | 5/62 | Martinek et al. | 32—14 |

FOREIGN PATENTS 436,597  10/35  Great Britain.

RICHARD A. GAUDET, *Primary Examiner.*